United States Patent
Probst et al.

(10) Patent No.: US 12,162,533 B1
(45) Date of Patent: Dec. 10, 2024

(54) CONTROL ASSEMBLY FOR ZERO TURN VEHICLE

(71) Applicant: Hydro-Gear Limited Partnership, Sullivan, IL (US)

(72) Inventors: Jesse L. Probst, Strasburg, IL (US); Nathan W. Bonny, Shelbyville, IL (US); Scott W. Keller, Charleston, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

(21) Appl. No.: 18/332,358

(22) Filed: Jun. 9, 2023

Related U.S. Application Data (62) Division of application No. 16/776,096, filed on Jan. 29, 2020, now Pat. No. 11,787,471.

(Continued)

(51) Int. Cl.
*B62D 11/04* (2006.01)
*A01D 34/82* (2006.01)
(Continued)

(52) U.S. Cl.
CPC ............ *B62D 11/04* (2013.01); *A01D 34/824* (2013.01); *A01D 69/02* (2013.01); *B60K 26/02* (2013.01);
(Continued)

(58) Field of Classification Search
CPC ........ B62D 11/04; B62D 11/003; B62D 1/12; A01D 34/824; A01D 69/02;
(Continued)

(56) References Cited

U.S. PATENT DOCUMENTS

| 3,055,226 A | 9/1962 | Kiessling |
| 3,224,291 A | 12/1965 | Zimmerman |

(Continued)

FOREIGN PATENT DOCUMENTS

EP 2327607 4/2013

OTHER PUBLICATIONS

"Zero" Electric Mower, Specification Page, Lawless Industries Ltd., Obtained online at http://web.archive.org/web/20060430133400/http://www.zeromow.com/ on Nov. 19, 2007, 1 p.

(Continued)

*Primary Examiner* — Mahmoud Gimie
(74) *Attorney, Agent, or Firm* — Neal, Gerber & Eisenberg LLP (57) ABSTRACT

A vehicle control system includes a communication network, a vehicle integration module, and a pair of control assemblies. Each of the pair of control assemblies is configured to be operated by a respective control lever and communicatively connected to the vehicle integration module. Each of the pair of control assemblies comprises an operator control assembly that includes a neutral switch, a return-to-neutral assembly configured to provide a return force to the respective control lever, a return-to-neutral shaft supporting a portion of the return-to-neutral assembly, a magnet attached to the return-to-neutral shaft, a position sensor assembly, and a linkage connecting the operator control assembly to the return-to-neutral assembly. The position sensor assembly includes a circuit board, a magnetic field sensor configured to sense a rotational orientation of the magnet, and a plurality of terminals for communication with the circuit board.

20 Claims, 9 Drawing Sheets

Related U.S. Application Data (60) Provisional application No. 62/798,045, filed on Jan. 29, 2019.

(51) Int. Cl.

| | |
|---|---|
| A01D 69/02 | (2006.01) |
| B60K 26/02 | (2006.01) |
| B60K 26/04 | (2006.01) |
| B60R 16/023 | (2006.01) |
| B62D 1/12 | (2006.01) |
| B62D 11/00 | (2006.01) |
| A01D 101/00 | (2006.01) |

(52) U.S. Cl.
CPC .......... *B60K 26/04* (2013.01); *B60R 16/0231* (2013.01); *B62D 1/12* (2013.01); *B62D 11/003* (2013.01); *A01D 2101/00* (2013.01); *B60K 2026/046* (2013.01)

(58) Field of Classification Search
CPC .... A01D 2101/00; B60K 26/02; B60K 26/04; B60K 2026/046; B60R 16/0231
USPC .......................................................... 701/41
See application file for complete search history.

(56) References Cited

U.S. PATENT DOCUMENTS

| | | | |
|---|---|---|---|
| 4,438,660 A | 3/1984 | Kittle | |
| 4,753,618 A | 6/1988 | Entringer | |
| 5,149,023 A | 9/1992 | Sakurai et al. | |
| 5,502,957 A | 4/1996 | Robertson | |
| 5,984,031 A | 11/1999 | Velke et al. | |
| 6,729,115 B2 | 5/2004 | Bartel | |
| 6,782,797 B1 | 8/2004 | Brandenburg et al. | |
| 7,134,276 B1 | 11/2006 | Langenfeld et al. | |
| 7,299,610 B2 | 11/2007 | Piontek | |
| 7,302,789 B2 | 12/2007 | Eavenson, Sr. et al. | |
| 7,313,915 B1 | 1/2008 | Windhorst et al. | |
| 7,458,311 B2 | 12/2008 | Korthals | |
| 7,458,432 B2 | 12/2008 | Mayer et al. | |
| 7,748,480 B2 | 7/2010 | Loxterkamp et al. | |
| 8,240,420 B1 | 8/2012 | Bartel et al. | |
| 8,459,137 B1 | 6/2013 | McCoy et al. | |
| 8,522,901 B1 | 9/2013 | VanLue | |
| 8,783,391 B2 | 7/2014 | Porter et al. | |
| 9,313,953 B2 | 4/2016 | Borshov et al. | |
| 9,499,199 B1 | 11/2016 | Laymon et al. | |
| 9,867,331 B1 * | 1/2018 | Siudyla | A01D 34/828 |
| 10,058,031 B1 | 8/2018 | Brown et al. | |
| 10,414,436 B1 | 9/2019 | Bonny | |
| 10,890,253 B1 | 1/2021 | Probst et al. | |
| 2004/0000130 A1 | 1/2004 | Bartel | |
| 2009/0217636 A1 | 9/2009 | Loxterkamp et al. | |
| 2012/0217083 A1 * | 8/2012 | Brickner | B62D 12/00 180/443 |
| 2016/0179128 A1 | 6/2016 | Guglielmo | |
| 2017/0037599 A1 | 2/2017 | Binstock et al. | |

OTHER PUBLICATIONS

Control Devices, Specification Sheet, Oct. 3, 2014, 3 pp.
Gerald, et al., "A new generation of contactless magnetic position sensors," Moving Magnet Technologies, 2006, 7 pp.
Honeywell Datasheet, Hall-Effect Rotary Position Sensors, RTY Series, Honeywell International Inc., Mar. 2016.
Seastar Electronic Shift & Throttle Quick Reference Guide, Marine Canada Acquisition Inc., 2014.
Seastar Solutions Installation Manual, Electronic Shift & Throttle (EST), i6800 Shift & Throttle System, 2014.
Technik, Position Transducers and Rotary Sensors, novotechnik, Siedle Group, Nov. 2008, 36 pp.

* cited by examiner

CONTROL ASSEMBLY FOR ZERO TURN VEHICLE

CROSS REFERENCE

This application is a divisional of U.S. patent application Ser. No. 16/776,096, filed on Jan. 29, 2020, which claims the benefit of U.S. Provisional Patent Application No. 62/798,045, filed on Jan. 29, 2019. These prior applications are incorporated by reference herein in their entirety.

BACKGROUND

The disclosure herein relates to a control assembly used to improve control of vehicles having zero turn drive systems. Other applications requiring separate controls of multiple outputs will be understood.

SUMMARY

It is known to use a return to neutral (RTN) assembly in conjunction with swash plate control of a hydrostatic transmission to bias the transmission to return to a neutral position when the operator is no longer applying a driving force by way of vehicle controls. Such a setup is less desirable or not possible in connection with certain hybrid or electric vehicles such as those disclosed herein, or in connection with an electric actuator. The speed control assembly disclosed herein therefore includes an RTN assembly (or module) linked to each operator control lever of a vehicle to provide a return to neutral force (or return force) thereto, to improve performance and operator control. In certain embodiments (not shown) a damper may be incorporated in the speed control assembly to damp this return to neutral bias.

A better understanding of the disclosure will be obtained from the following detailed descriptions and accompanying drawings, which set forth illustrative embodiments indicative of the various ways in which the principals of the invention may be employed.

DETAILED DESCRIPTION OF THE DRAWINGS

The description that follows describes, illustrates and exemplifies one or more embodiments of the invention in accordance with its principles. This description is not provided to limit the invention to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers in cases where such labeling facilitates a more clear description. Additionally, the drawings set forth herein are not necessarily drawn to scale, and in some instances proportions may have been exaggerated to more clearly depict certain features. This specification is intended to be taken as a whole and interpreted in accordance with the principles of the invention as taught herein and understood by one of ordinary skill in the art.

Figure 7:
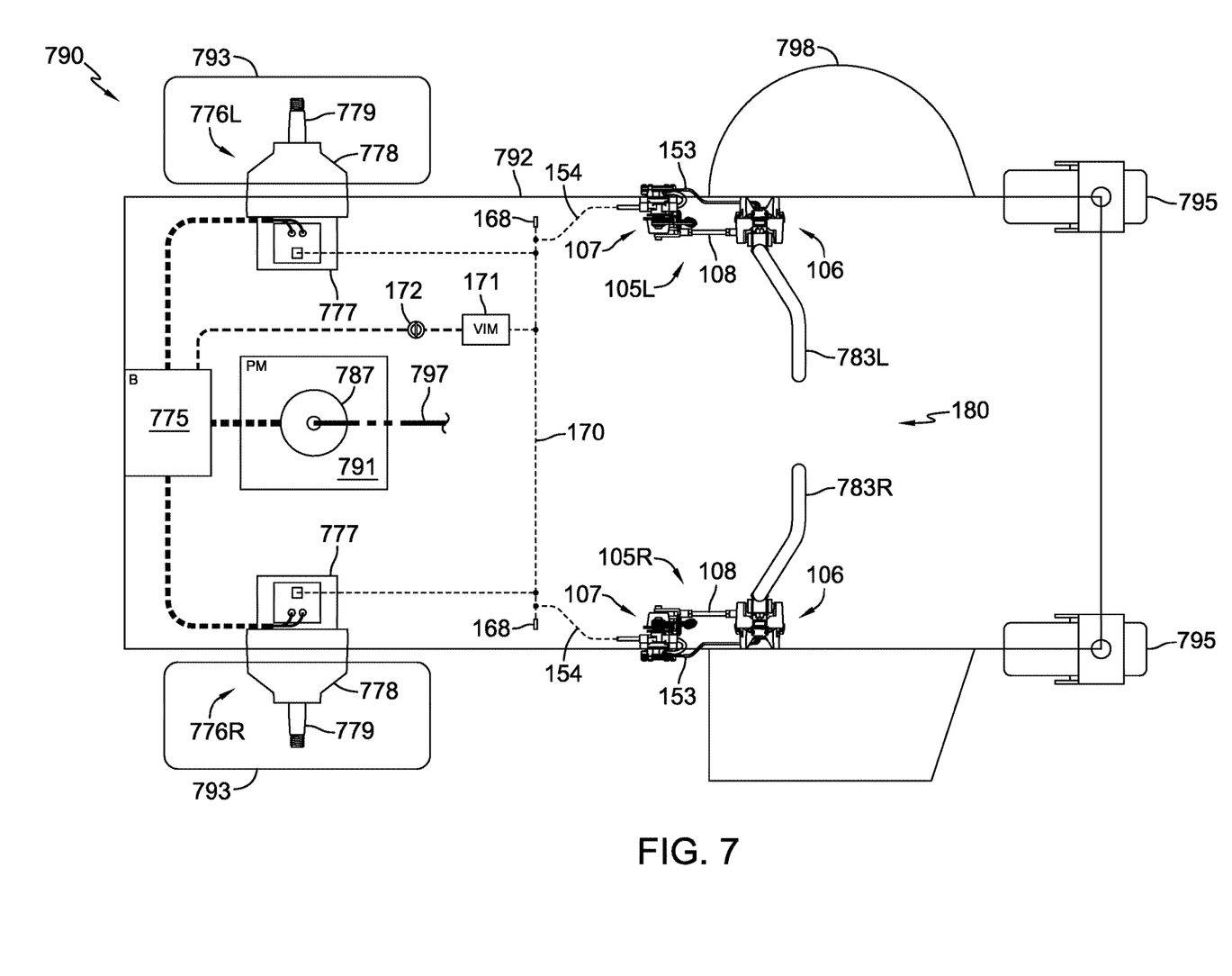
FIG. 7 is a partially schematic representation of a first exemplary vehicle incorporating a control assembly in accordance with the teachings herein.
Figure 8:
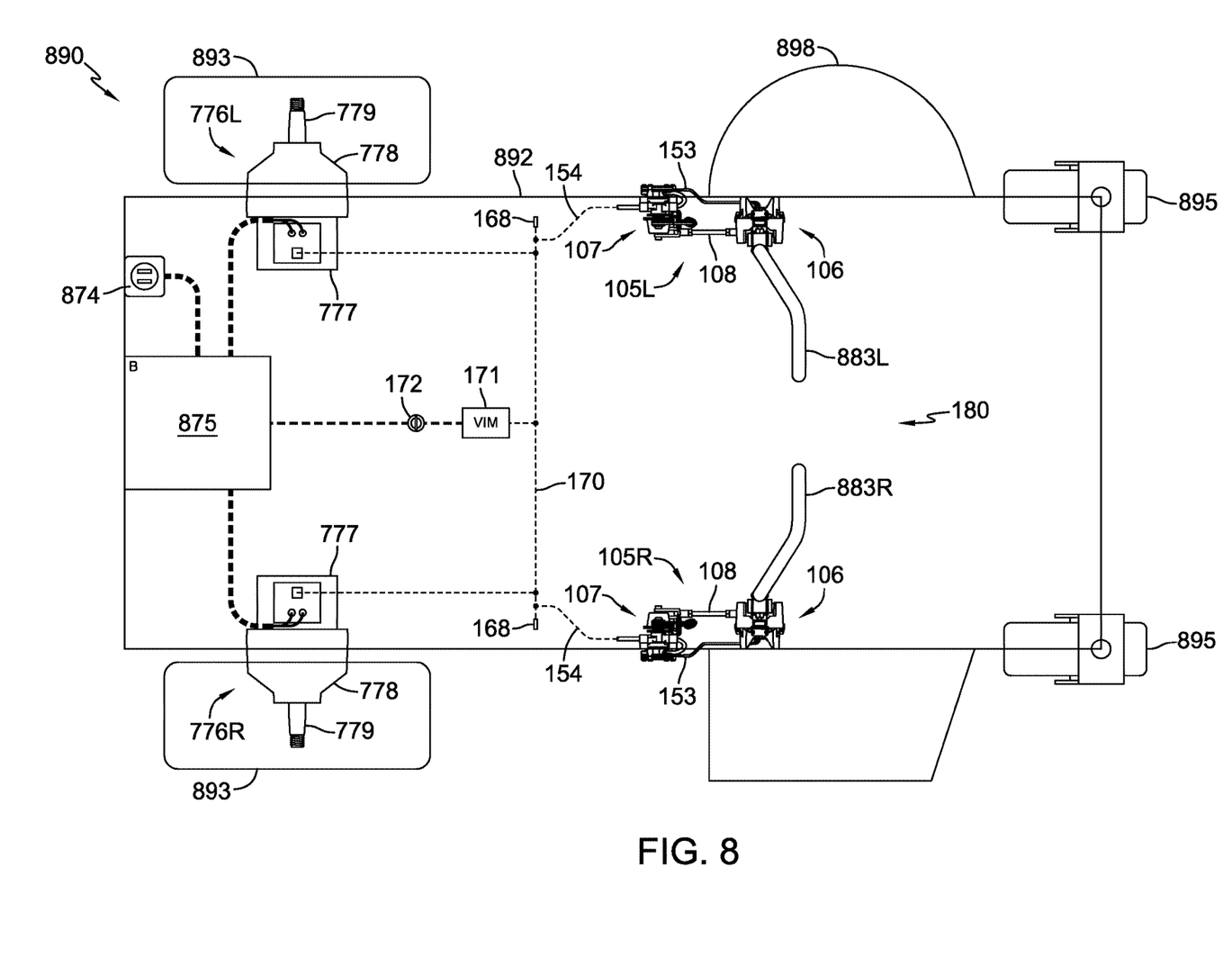
FIG. 8 is a partially schematic representation of a second exemplary vehicle incorporating a control assembly in accordance with the teachings herein.
Figure 9:
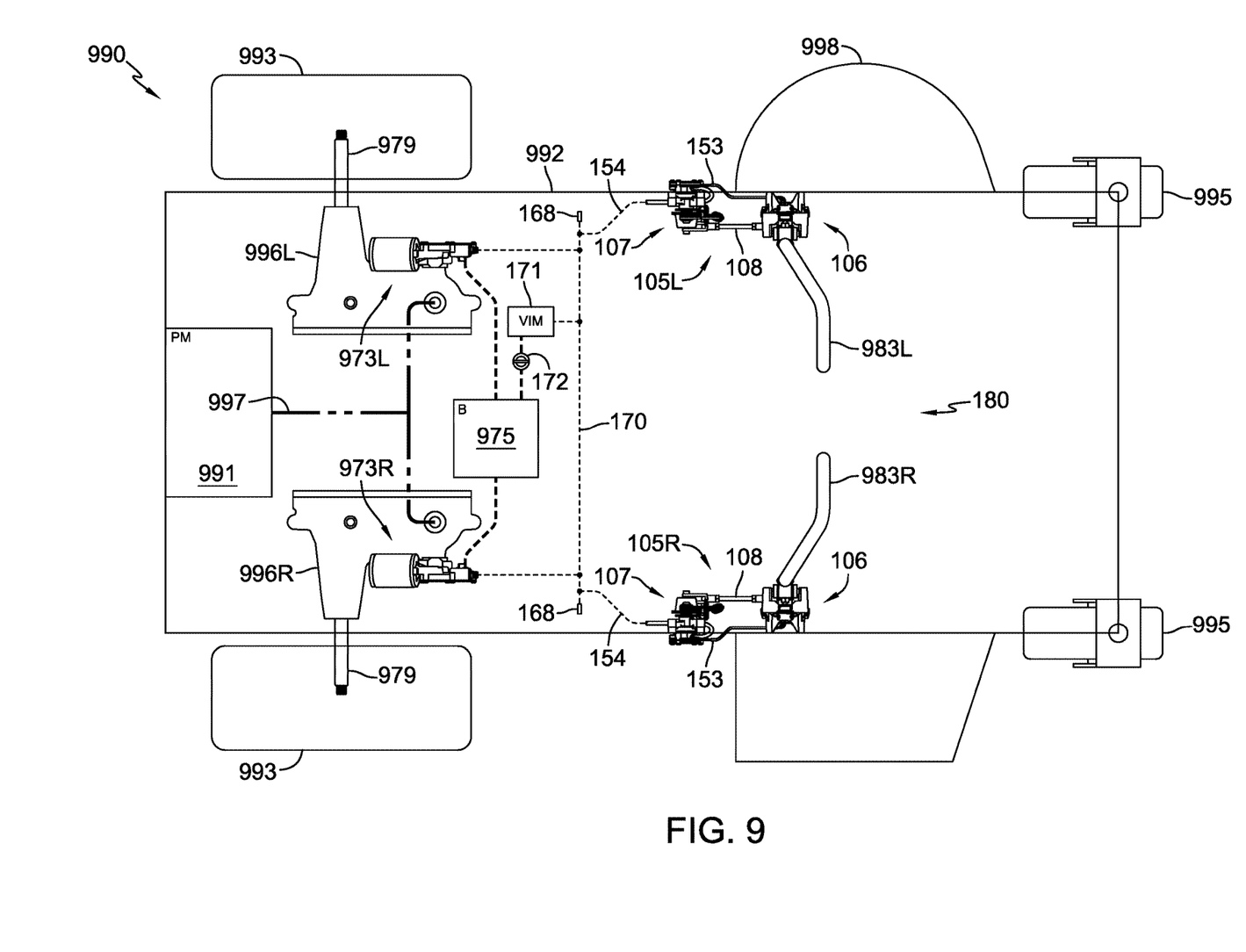
FIG. 9 is a partially schematic representation of a third exemplary vehicle incorporating a control assembly in accordance with the teachings herein.

The speed control assembly disclosed herein may be used in vehicles such as zero turn lawn and garden tractors, and exemplary vehicles using different types of drive members are depicted herein in FIGS. 7-9. FIG. 7 depicts an exemplary hybrid vehicle 790 on which the control assembly disclosed herein may be used. Vehicle frame 792 supports an optional mowing deck 798 that may be selectively engaged and driven by a conventional belt and pulley system 797. Vehicle frame 792 also supports a pair of front casters 795, a battery 775, and internal combustion engine 791. Engine 791 drives a generator 787 and the belt and pulley system 797. A pair of electric transaxles 776L, 776R, each having an electric motor 777, is disposed on opposite sides of vehicle frame 792 and each electric motor 777 drives a gear reduction 778 and an output axle 779 to power a driven wheel 793.

In the vehicle 790 depicted in FIG. 7, a pair of speed control assemblies 105L, 105R is connected to respective control levers 783L, 783R. An exemplary speed control assembly 105 is depicted in FIGS. 1-6. The speed control assemblies 105L, 105R shown in vehicle 790 are simply left and right-hand configurations of speed control assembly 105 and are essentially mirror images of one another. Electric motors 777 and speed control assemblies 105L, 105R are connected to a Vehicle Integration Module (VIM) 171 by way of a CAN Bus (communication network) 170. These speed control assemblies 105L, 105R, VIM 171, and CAN Bus 170 are part of a programmable vehicle control system 180. CAN Bus 170 is powered through the VIM 171, which receives power from battery 775 when key switch 172 is turned on, and directs power and serial communication through CAN Bus 170. Control signals are generated and transmitted by the speed control assemblies 105L, 105R via CAN Bus 170 in response to operator manipulation of the left and right-hand control levers 783L, 783R. These control signals are processed by the VIM 171 to control the output of the electric motors 777. A CAN Bus termination module 168 (comprising a resistor) is connected to each end of the CAN Bus 170 network wiring harness to ensure communication speed and signal integrity on CAN Bus 170.

FIG. 8 depicts a second exemplary vehicle, and specifically an exemplary electric vehicle 890 that is similar in many respects to hybrid vehicle 790. Vehicle frame 892 supports an optional mowing deck 898 and a pair of front casters 895, along with a battery 875. A charge receptacle 874 is also provided. As in vehicle 790, a pair of electric transaxles 776L, 776R, each having an electric motor 777, is disposed on opposite sides of vehicle frame 792 and each electric motor 777 drives a gear reduction 778 and an output axle 779 to power a driven wheel 893. Electric motors 777 and speed control assemblies 105L, 105R are connected to a Vehicle Integration Module (VIM) 171 by way of a CAN Bus (communication network) 170. These speed control assemblies 105L, 105R, VIM 171, and CAN Bus 170 are part of a programmable vehicle control system 180. CAN Bus 170 is powered through the VIM 171, which receives power from battery 875 when key switch 172 is turned on, and directs power and serial communication through CAN Bus 170. Control signals are generated and transmitted by the speed control assemblies 105L, 105R via CAN Bus 170 in response to operator manipulation of the left and right-hand control levers 883L, 883R. These control signals are processed by the VIM 171 to control the output of the electric motors 777. A CAN Bus termination module 168 is connected to each end of the CAN Bus 170 network wiring harness to ensure communication speed and signal integrity on CAN Bus 170.

FIG. 9 depicts a third exemplary vehicle, and specifically vehicle 990 having an internal combustion engine 991 disposed on frame 992 and driving a pair of hydrostatic transaxles 996L, 996R using a conventional belt and pulley system 997 that may include a power take off (PTO) clutch-brake mechanism. Vehicle frame 992 supports an optional mowing deck 998 that may be selectively engaged and driven by the belt and pulley system 997. Vehicle frame 992 also supports a pair of front casters 995 and a battery 975. Each hydrostatic transaxle 996L, 996R has a respective electric actuator 973L, 973R connected to CAN Bus 170, and drives one of the output axles 979 to power a driven wheel 993. The hydrostatic transaxles may be similar in structure and operation to the transaxles depicted in commonly owned U.S. Pat. No. 7,134,276, the terms of which are incorporated herein by reference. As before, speed control assemblies 105L, 105R are connected to a VIM 171 by way of the CAN Bus 170 and these components are part of a programmable vehicle control system 180. CAN Bus 170 is powered through the VIM 171, which receives power from battery 975 when key switch 172 is turned on, and directs power and serial communication through CAN Bus 170. Control signals are generated and transmitted by the speed control assemblies 105L, 105R via CAN Bus 170 in response to operator manipulation of the left and right-hand control levers 983L, 983R. These control signals are processed by the VIM 171 to control the output of the electric actuators 973L, 973R, which in turn control the output of the hydrostatic transaxles 996L, 996R, respectively. A CAN Bus termination module 168 is connected to each end of the CAN Bus 170 network wiring harness to ensure communication speed and signal integrity on CAN Bus 170.

As disclosed herein, there is flexibility in the location of the components such as operator control mechanism 106 and RTN module 107. By way of example, in the vehicle embodiments disclosed in FIGS. 7-9, each traction drive, e.g., transaxle 776R, 996R, is disposed on vehicle 790 at a first location, each operator control mechanism 106 is disposed on vehicle 790 at a second location remote from the first location, and each RTN module 107 is located on vehicle 790 at a third location that is remote from both the first and second locations. In the embodiments depicted, the third location is disposed between the first location and the second location, when viewed along the longitudinal axis of vehicle 790, 890, 990. It will be understood by one of skill in the art that other locations of RTN module 107 are contemplated within the scope of this disclosure. Location of the RTN module 107 at a location remote from both the first and second locations offers benefits such as the ability to use smaller modules for the other components, or to accommodate different needs of the vehicle in which such components are installed.

The programmable vehicle control system 180 of vehicles 790, 890, 990 is similar to that described in U.S. Pat. No. 10,058,031, which is incorporated by reference herein in its entirety, and this vehicle control system 180 may include not only the intelligent, electronic modules described herein, but additional intelligent, electronic modules functioning as a single system and coordinating their activities via CAN Bus 170.

For purposes of this disclosure, the speed control assemblies 105L, 105R may include features and functionality described in U.S. Pat. No. 10,414,436, which is incorporated by reference herein in its entirety. And, electric actuators 973L, 973R may include any or all of the features and functionality described in U.S. patent application Ser. No. 15/944,571, filed Apr. 3, 2018, which is also incorporated by reference herein in its entirety.

In other vehicle systems, such as those depicted in U.S. Pat. No. 10,414,436, a drive controller may be used in lieu of the CAN Bus 170 network and VIM 171, and speed control assemblies similar in form to speed control assemblies 105L, 105R (but having electronic components for use with a drive controller) may be employed.

As shown in the embodiment depicted in FIGS. 1-6, speed control assembly 105 includes an operator control mechanism 106 and a return to neutral (RTN) module 107 connected by an adjustable linkage 108. The linkage 108 includes fasteners 108a, 108b located at its opposite ends to provide pivotable connections to arms of the operator control mechanism 106 and the RTN module 107, respectively, as will be described in more detail below.

Figure 1:
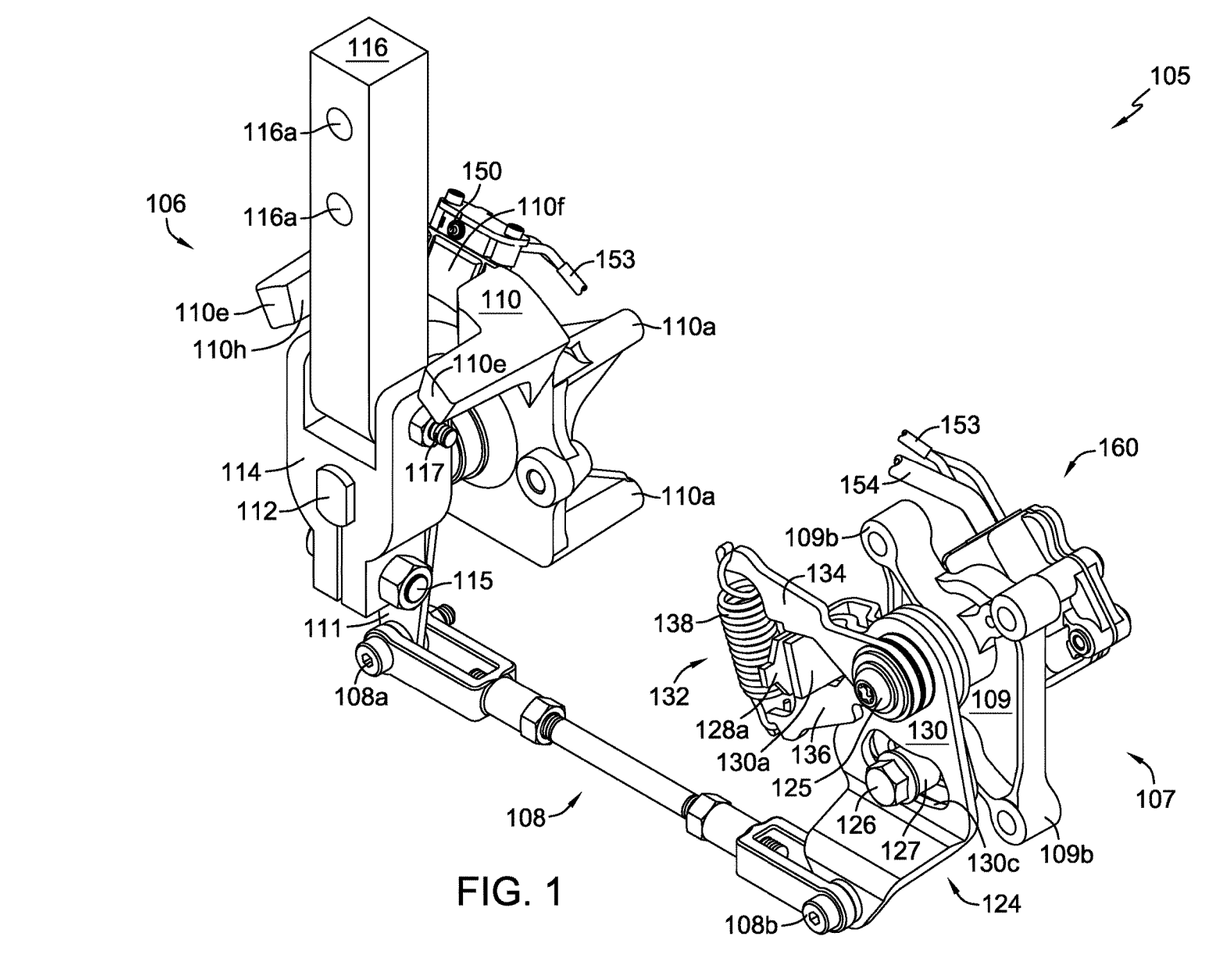
FIG. 1 is a perspective view of a control assembly in accordance with the teachings herein.
Figure 2:
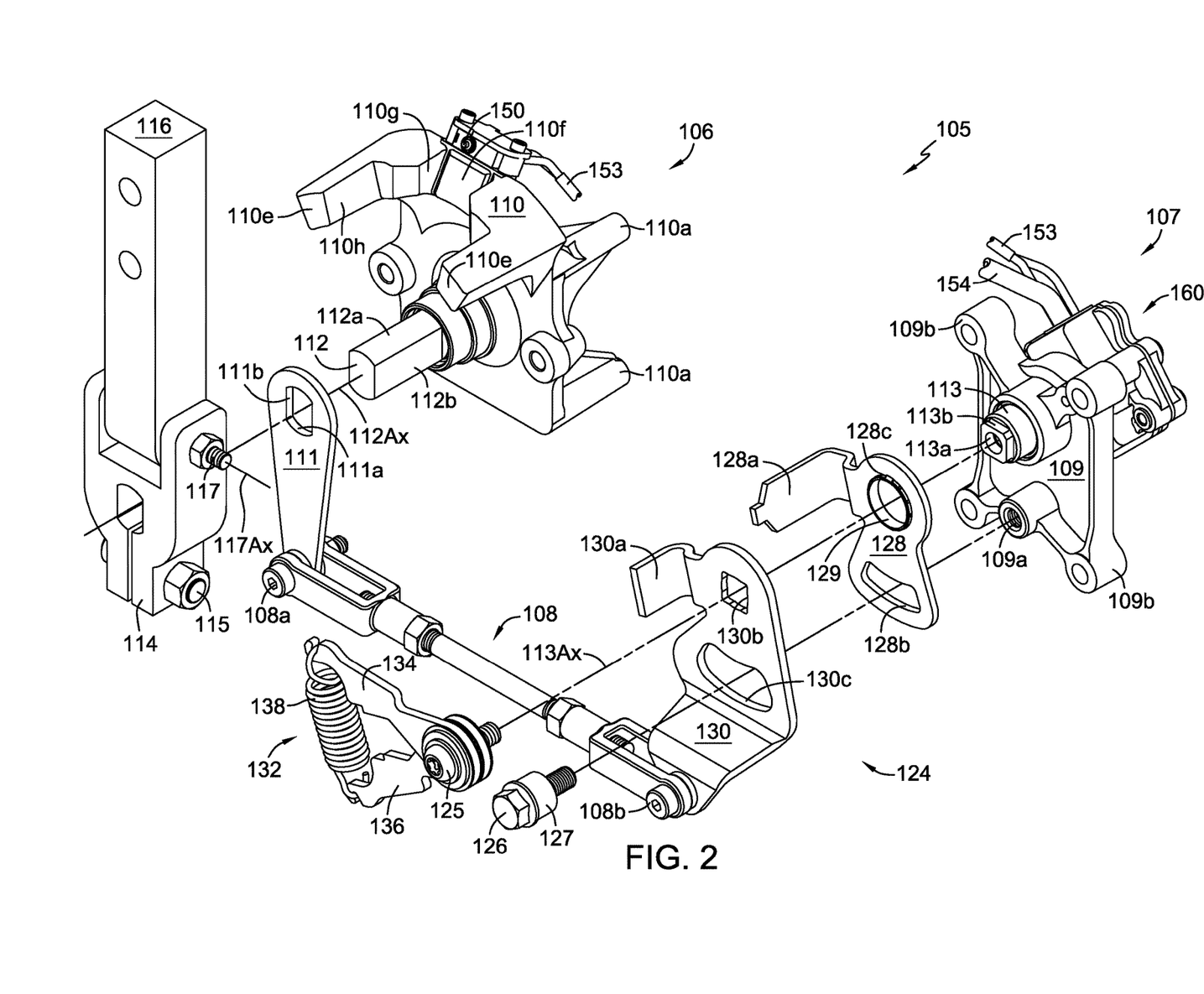
FIG. 2 is a partially exploded perspective view of the control assembly of FIG. 1.
Figure 3:
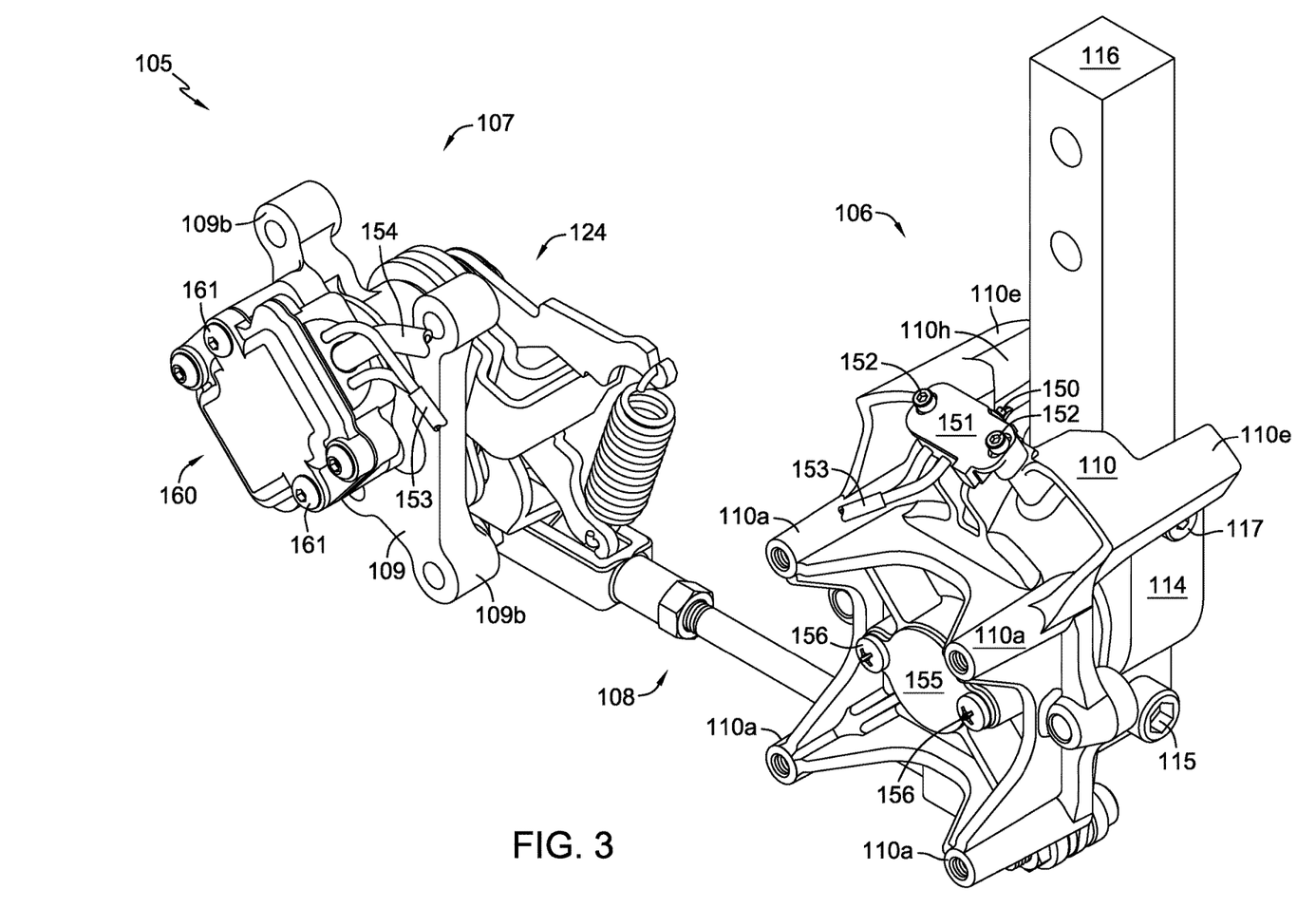
FIG. 3 is an opposite perspective view of the control assembly of FIG. 1.
Figure 4:
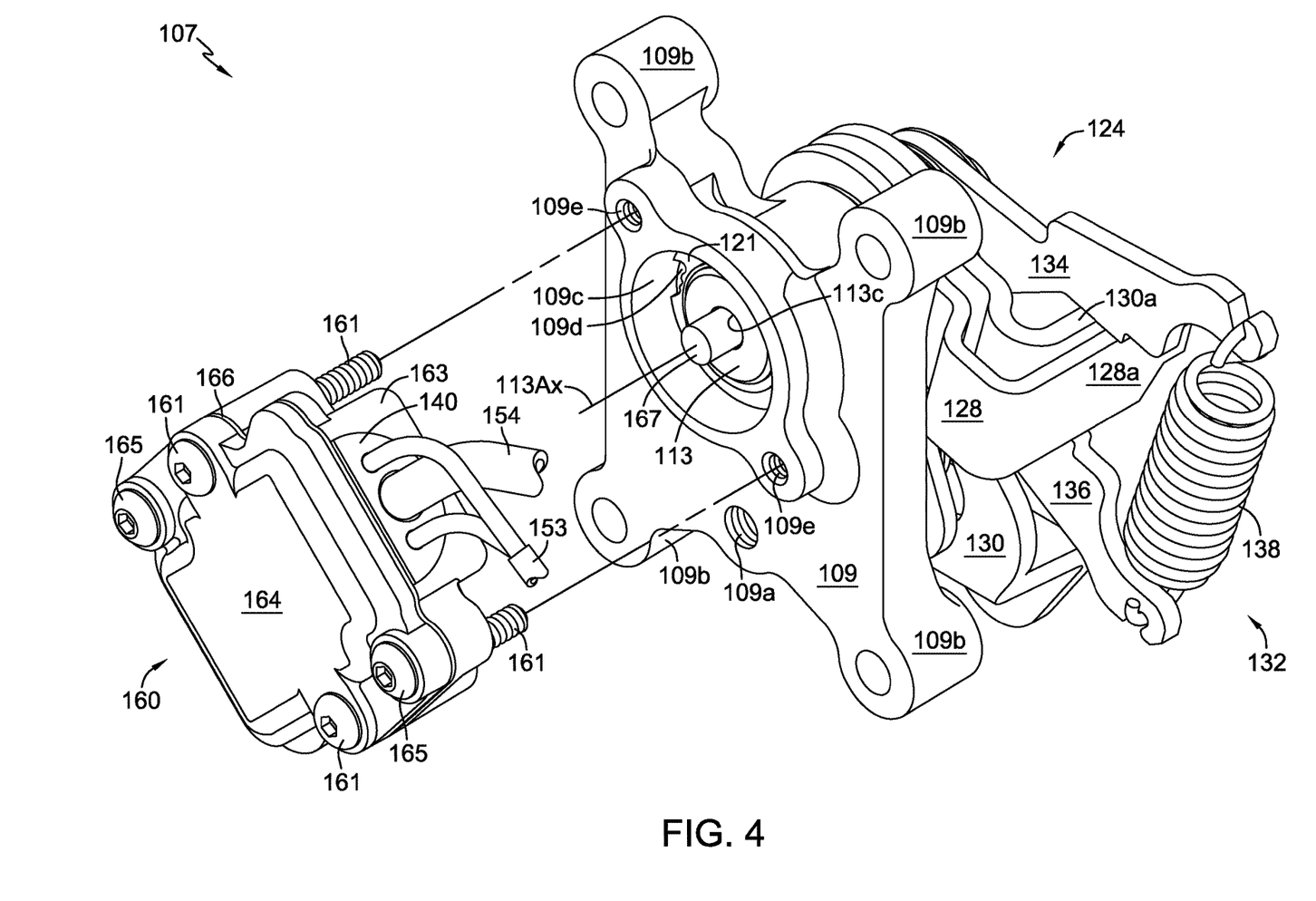
FIG. 4 is a partially exploded perspective view of an RTN module of the control assembly of FIG. 3.

The operator control mechanism 106 may include a pivot bar 116 for providing operator input, e.g., via control levers 783L, 783R described previously herein and attached to pivot bars 116 utilizing fasteners (not shown) to engage fastener openings 116a. Optionally, a component such as pivot bar 116 and a control lever such as a control lever 783L or 783R can be integrally formed. Control levers 783L, 783R may be shaped in various ways and are not limited to the known "lap bars" configuration shown. For example, control levers 783L, 783R may each comprise a knob such that the control levers 783L, 783R resemble a pair of gear shift levers or single axis joysticks that can be moved in forward and reverse directions. Pivoting of the pivot bar 116 about a first pivot axis 112Ax of shaft 112 corresponds to forward and reverse movement of the vehicle, and a neutral position is provided. As shown in FIGS. 1-3, pivot bar 116 is in its operative position, where it may be pivoted about the first pivot axis 112Ax to a plurality of forward positions and a plurality of reverse positions. Pivot bar 116 is depicted in FIGS. 1-3 as being in a neutral position. It is also understood that when pivot bar 116 is in this neutral position, it may be pivoted about a second pivot axis 117Ax to a position where it engages a switch 150, as described in more detail below. The first pivot axis 112Ax and the second pivot axis 117Ax are oriented perpendicular to one another.

A bracket 110 is used to support certain components disclosed herein, and to attach operator control mechanism 106 to a vehicle frame (e.g. vehicle frame 792) as disclosed elsewhere in this specification. A set of mounting bosses 110a is provided for securing the bracket 110 to the vehicle frame (or other vehicle structure). For convenience, reference is made herein to vehicle 790 in conjunction with the discussion of the speed control assembly 105, and it will be understood that this assembly and the teachings herein can be applied to the other vehicles disclosed herein, as well as to other applications.

Pivot bar 116 is secured to a yoke 114 by means of a fastener 117 and yoke 114 is secured to shaft 112 by means of a fastener 115. The combination of pivot bar 116 and yoke 114 is thus engaged to and controls the pivoting of shaft 112 about the first pivot axis 112Ax. As described above, pivot bar 116 is also pivotable about a second pivot axis 117Ax, namely the longitudinal axis of fastener 117, to move from the operative position of FIGS. 1-3 to a neutral stop position (or stopped position), wherein pivot bar 116 engages a switch 150, which may be called a "neutral switch" herein. With respect to switch 150, it will be understood that this term is being used broadly to include switches that are preferably activated when the operator wishes to place the traction drives and the vehicle in a neutral or stopped state. Such a switch could be referred to as a park switch or a brake switch depending on the function thereof. For example, a switch 150 could activate an electrically applied brake (not shown) associated with the traction drives of the various vehicles depicted herein. In the vehicle configurations depicted in FIGS. 7 and 8, for example, activation of a switch such as switch 150 may place the electric motors 777 in an unpowered state such that no drive output is provided to the axles 779. In the FIG. 9 vehicle configuration, activation of switch 150 could result in electric actuators 973L, 973R being driven to a neutral position. Furthermore, activation of switch 150 may result in more than one response by the vehicle control system 180, such as disengaging a PTO device (such as a clutch-brake associated with a mowing deck), driving electric actuators to a neutral position, removing power from traction drives, and engaging traction drive brakes and/or other vehicle wheel brakes. Switches 150 may be employed in a vehicle start-up function or to initiate an engine kill function. These actions initiated by switch 150 may occur simultaneously or sequentially, or as a combination of simultaneous and sequential actions as governed by the programmable vehicle control system 180.

Bracket 110 includes a pair of arms 110e that provides stops 110h for limiting the range of motion of pivot bar 116 in the operative position. When pivot bar 116 is moved into the neutral stop position, a pair of neutral range stays 110g restricts forward and reverse rotation of pivot bar 116 and a neutral switch stop 110f is provided to limit movement of pivot bar 116 toward neutral switch 150 to prevent damage to neutral switch 150 during activation. Additionally, features (e.g., guide slots, not shown) of vehicle frame 792 or attachments thereto (not shown) may further limit movement of pivot bar 116 and/or associated control levers 783L, 783R.

As shown in FIG. 3, a cover plate 155 is secured to bracket 110 by means of fasteners 156 to protect shaft 112 and any associated support bearings or bushings (not shown). An extension 112a of shaft 112 protrudes from the opposite side of bracket 110 and has a pair of flats 112b formed thereon to engage a pair of mating flats 111b formed on opposite sides of an opening 111a formed in a linkage attachment arm 111. Linkage attachment arm 111 is secured on shaft 112 by the attachment of yoke 114, and linkage attachment arm 111 and yoke 114 pivot together when shaft 112 is pivoted. A washer (not shown) may be added, if needed, to reduce frictional wear of adjacent components such as linkage attachment arm 111 and bracket 110. It should be noted that yoke 114 and linkage attachment arm 111 may be integrally formed. Neutral switch 150 is retained on bracket 110 by means of a switch retainer 151 and fasteners 152 engaged to bracket 110. Neutral switch 150 includes insulated electrical conductors 153 that are routed to a position sensor module 160 of the RTN module 107. (The position sensor module 160 may also be called a "lap bar sensor module" or "LBSM" when used in conjunction with lap bars.) Whenever a neutral switch 150 is activated, a corresponding neutral position of a pivotable magnet 167 of the position sensor module 160 may be verified by the vehicle control system 180.

A linkage 108 connects the linkage attachment arm 111 of the operator control mechanism 106 to a control arm 130 of the RTN module 107. RTN module 107 includes an RTN mechanism 124 comprising the control arm 130, a scissors RTN subassembly 132, and a fixed neutral arm 128. RTN mechanism 124 is incorporated to provide a neutral return bias to pivot bar 116 (via linkage 108, linkage attachment arm 111 and shaft 112) when pivot bar 116 is in the operative position and pivoted either in the forward or reverse direction. The neutral arm 128 is supported on an RTN shaft 113 that is rotatably supported in an RTN mounting bracket 109, and neutral arm 128 is secured to bracket 109 by means of a neutral set screw 126 and a lockdown bushing 127. RTN shaft 113 is pivotable within a bushing 129 disposed in mounting opening 128c formed in fixed neutral arm 128. During assembly, the neutral set screw 126 and the lockdown bushing 127 are inserted through guide slot 130c. When neutral set screw 126 is further inserted through neutral adjustment slot 128b and fastened to a threaded lockdown opening 109a formed on bracket 109, the lockdown bushing 127 is forced against the neutral arm 128 to hold it in place against bracket 109, and bushing 127 further serves as a forward and reverse pivot motion limiter for control arm 130 since bushing 127 is positioned within the guide slot 130c upon completion of assembly. The RTN mechanism 124 can be similar in many respects to that disclosed in commonly owned U.S. Pat. No. 7,313,915, the terms of which are incorporated by reference herein.

The scissors RTN subassembly 132 is pivotally supported on an RTN mounting fastener 125 that engages a threaded axial bore 113a formed in the external protruding end of the RTN shaft 113. Axial bore 113a is coincident with a third pivot axis 113Ax of the RTN shaft 113. The third pivot axis 113Ax is oriented parallel to the first pivot axis 112Ax. The scissors RTN subassembly 132 comprises a first return arm 134 and a second return arm 136, both of which are connected to one another by means of a biasing spring 138. Pivoting of shaft 112 in either a clockwise or counterclockwise direction will cause pivoting of control arm 130 and RTN shaft 113, by means of previously described linkage attachment arm 111, linkage arm 108, and engagement of a flats interface opening 130b (formed in control arm 130) with RTN shaft flats 113b (formed on RTN shaft 113). When control arm 130 pivots, an extension 130a of control arm 130 will contact and move either first return arm 134 or second return arm 136, depending on the direction of rotation, and biasing spring 138 will provide a return force to bias the control arm 130 and ultimately, the pivot bar 116, back to the neutral position. Neutral arm extension 128a establishes the neutral return position of first return arm 134 and second return arm 136 when neutral arm 128 is secured in the neutral position as described previously herein.

As disclosed herein, scissors RTN subassembly 132 is bi-directional, to provide a return bias when pivot bar 116 is pivoted in either the forward or reverse direction, but it will be understood that scissors RTN subassembly 132 could be made unidirectional, for use in other applications, upon minor modification of one of the return arms 134 or 136, e.g., as disclosed in commonly owned U.S. Pat. No. 6,782,797, the terms of which are incorporated by reference herein.

A sealed position sensor module 160 is attached to mounting bracket 109 by means of fasteners 161 that engage threaded bores 109e formed in bracket 109 and the RTN module 107 is attached to the vehicle frame 792 (or other vehicle structure) by means of a set of mounting bosses 109b. Position sensor module 160 can be mounted as illustrated or can be rotated 180 degrees about the pivot axis 113Ax and mounted in this optional orientation. Position sensor module 160 is oriented such that conductors 153 and cable 154 extend diagonally upward or diagonally downward to facilitate routing of conductors 153 and cable 154 in a vehicle application. A cylindrical diametric magnet 167 is secured in magnet mounting pocket 113c formed in the protected internal end of RTN shaft 113 and, when position sensor module 160 is attached to the mounting bracket 109, magnet 167 protrudes into a magnet proximity pocket 163a formed in sensor housing 163 to place it in proximity to a magnetic field sensor chip 162a that is located on a circuit board 162 inside the sealed position sensor module 160. The wall of the magnet proximity pocket 163a interposed between magnetic field sensor chip 162a and magnet 167 is sufficiently thin to allow the magnetic field sensor chip 162a to sense the orientation of magnet 167 through the wall of the magnet proximity pocket 163a, thus allowing magnet 167 to be positioned external to the sealed position sensor module 160.

RTN shaft 113 is supported in an RTN shaft bushing 119 located in a stepped bore 109c formed through the mounting bracket 109. A retaining ring 120 engaged to the RTN shaft 113, in combination with a washer 121 in contact with a shoulder or land 109d of the stepped bore 109c, limits the axial movement of RTN shaft 113 in a first direction. The attached position sensor module 160, along with a spacer 122, limits the axial movement of RTN shaft 113 in a second direction, and ensures proper location of magnet 167. The longitudinal axes of the stepped bore 109c, magnet 167 and pockets 113c and 163a are coincident with the pivot axis 113Ax of RTN shaft 113.

Figure 5:
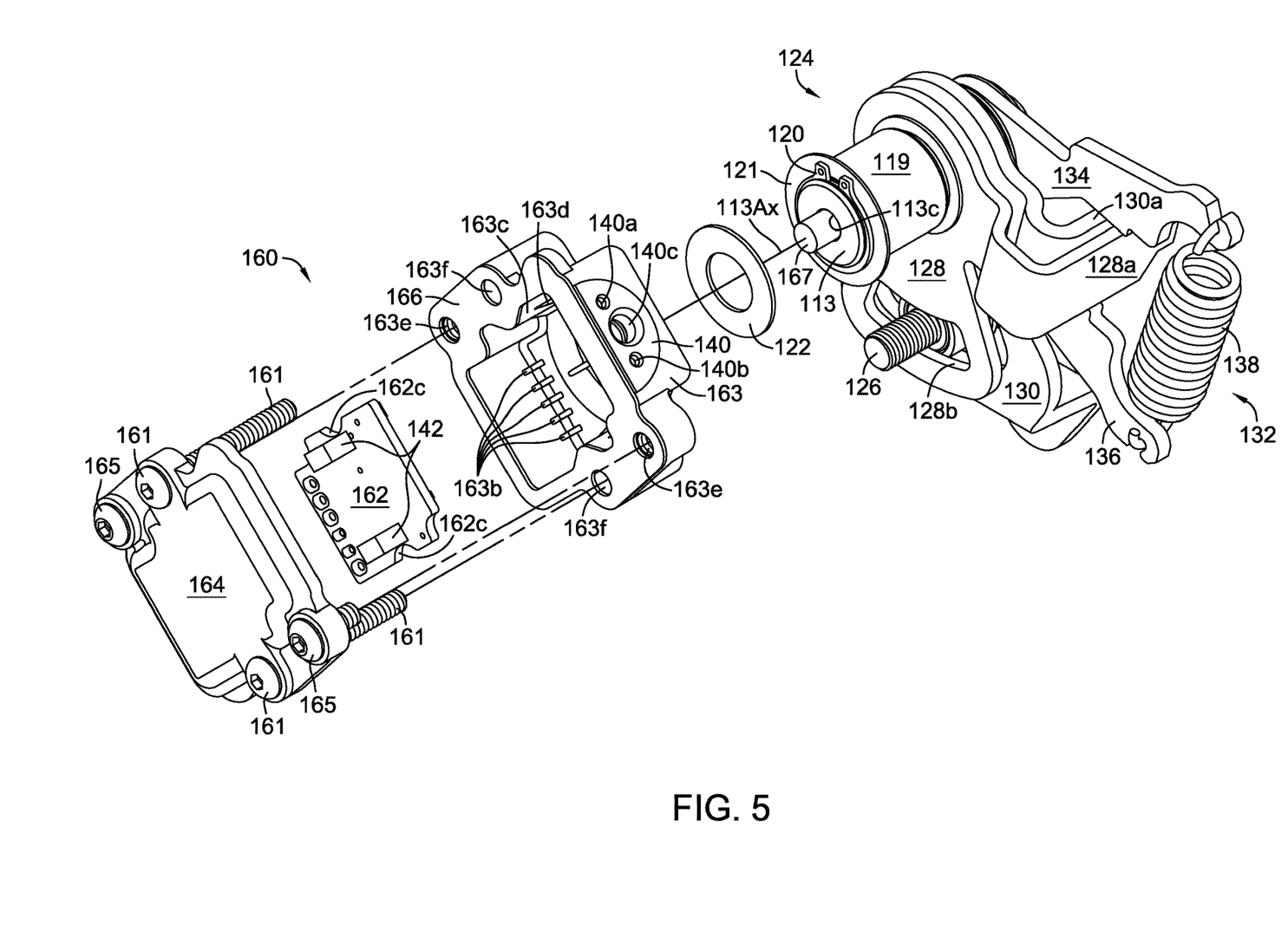
FIG. 5 is an exploded perspective view of selected components of the RTN module of FIG. 4, including a sensor module, and with certain components of the RTN module removed for clarity.
Figure 6:
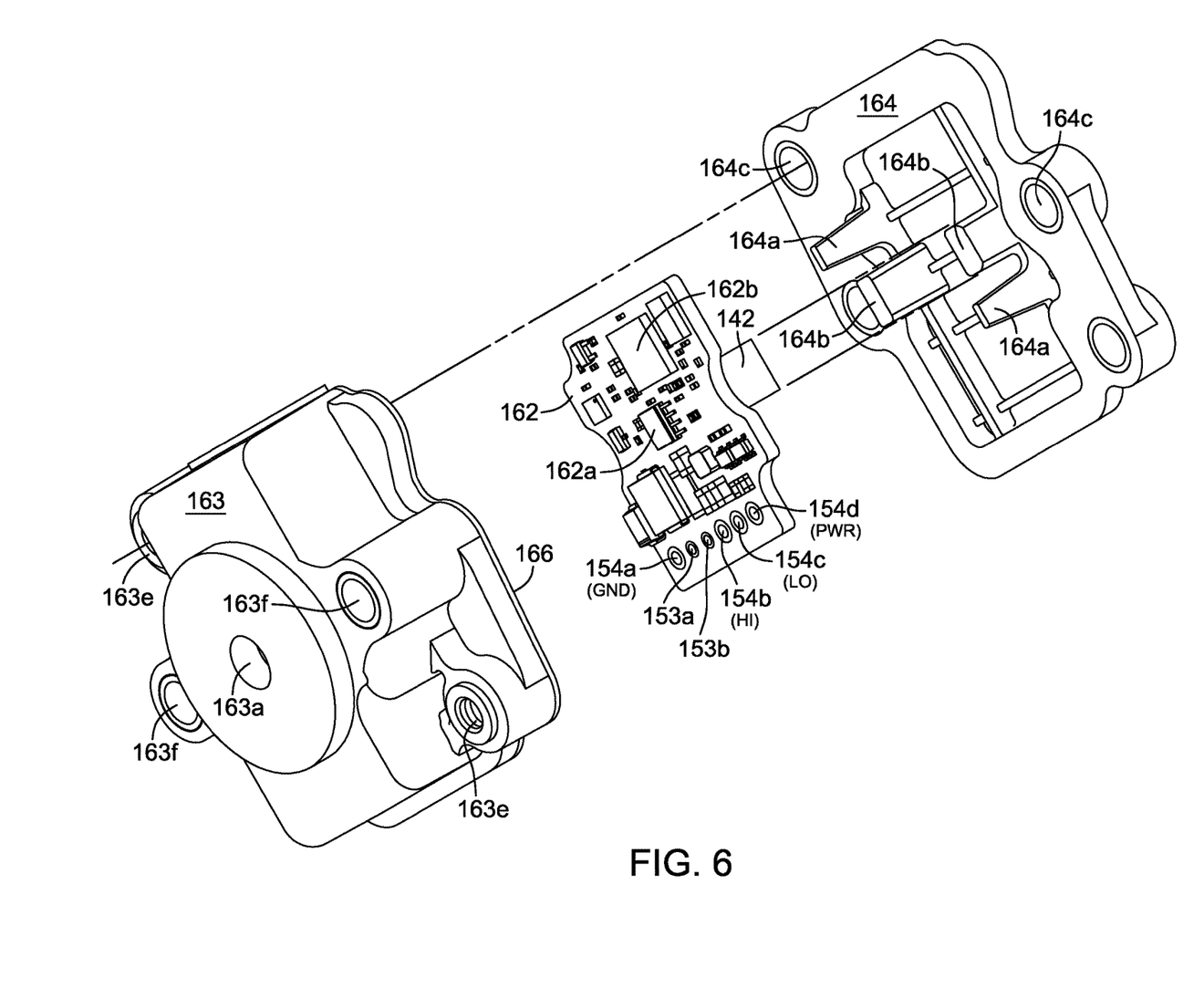
FIG. 6 is an opposite exploded perspective view of the sensor module shown exploded in FIG. 5.

The position sensor module 160 includes the sensor housing 163, a cover 164 and the circuit board 162, and is sealed using a gasket 166 and a specialized half-circle grommet 140 that is located peripherally on the sensor housing 163. The sensor cover 164 is secured to sensor housing 163 by means of fasteners 165 that engage threaded inserts 163e molded into sensor housing 163. Fasteners 161 pass through smooth bore inserts 163f (also molded into sensor housing 163) to engage threaded bores 109e in bracket 109. Sensor cover 164 also includes molded-in-place smooth bore inserts 164c for each of its fastener openings. As best seen in FIG. 5, the half-circle grommet 140 includes a pair of openings 140a, 140b for routing of the neutral switch conductors 153 and an opening 140c disposed between openings 140a, 140b for routing of the CAN Bus cable 154. The sensor housing 163 and circuit board 162 include cooperative features to guide circuit board 162 into an exact position during assembly and retain it in this exact position to ensure proper location of the magnetic field sensor chip 162a in relation to the magnet 167.

Circuit board 162 is guided onto a plurality of circuit board support ribs 163b by means of a pair of indentations 162c that interface with a pair of mating contours 163c. At least one sacrificial interference fin (or crush fin) 163d is formed on each of the mating contours 163c to grip and retain circuit board 162 when it is pushed into position against the support ribs 163b. When sensor cover 164 is installed, a pair of guide projections 164a further ensures the location of circuit board 162. Additionally, at least one cushion pressure post 164b applies pressure to at least one cushion 142 positioned against circuit board 162 to further retain circuit board 162 and protect it from shock and vibration. Optionally, in lieu of the guide projections 164a, posts 164b and cushions 142, circuit board 162 may be "potted" in position, as is known in the electronic arts. "Potting" is a widely used process to improve resistance to shock and vibration and to prevent corrosion and, in this particular assembly, could be used to ensure both proper positioning and longevity of circuit board 162.

Position sensor module 160 incorporates circuit board 162 having CAN Bus communication capability and comprising the magnetic field sensor chip 162a (that senses the rotational orientation of the magnetic field of magnet 167), a microprocessor 162b, and terminal sets 153a, 153b and 154a, 154b, 154c, 154d for connection of a pair of neutral switch conductors 153 and the CAN Bus conductors of cable 154, respectively. The CAN Bus terminals 154a, 154b, 154c, 154d designations are CAN Ground (GND), CAN High (HI), CAN Low (LO) and CAN Power (PWR), respectively. Neutral switch conductors 153 are routed from the neutral switch 150 through the specialized grommet 140 and may be spliced using waterproof connectors, if desired. CAN Bus cable 154 is connected to circuit board 162 and is also connected to CAN Bus 170 on vehicle 790 to provide sensor data to the communication network. Commercially available CAN Bus connectors may be used to connect CAN Bus cable 154 (and other CAN Bus module cables) to the CAN Bus 170.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A programmable vehicle control system comprising:
 a CAN Bus communication network of a vehicle including a vehicle integration module; and
 a first control assembly operated by a first control lever and connected to the vehicle integration module to control an output of a first traction drive, and a second control assembly operated by a second control lever and connected to the vehicle integration module to control an output of a second traction drive;
 wherein the first control assembly and the second control assembly each separately comprise an operator control mechanism, including a neutral switch, and a linkage connecting the operator control mechanism to a separate return to neutral module, wherein each separate return to neutral module comprises:

a return to neutral mechanism to provide a return force to one of the first or second control levers when one of the first or second control levers is pivoted away from a neutral position;
a return to neutral shaft at least partially supporting the return to neutral mechanism and having a magnet attached thereto; and
a position sensor module including a circuit board comprising a processor, a magnetic field sensor chip to sense a rotational orientation of the magnet, a first plurality of terminals to connect a CAN Bus cable to the circuit board, and a second plurality of terminals to connect conductors from the neutral switch to the circuit board.

2. The programmable vehicle control system of claim 1, wherein the neutral switch of each of the first control assembly and the second control assembly provides a signal to the vehicle integration module to place one of the first or second traction drives of the vehicle in a neutral state.

3. The programmable vehicle control system of claim 1, wherein the neutral switch of each of the first control assembly and the second control assembly provides a signal to the vehicle integration module to initiate more than one response by the vehicle, including disengagement of a PTO device and placement of one or more electric motors in an unpowered state.

4. The programmable vehicle control system of claim 1, wherein the neutral switch of each of the first control assembly and the second control assembly provides a signal to the vehicle integration module to initiate more than one response by the vehicle, including removing power from one or both of the first and second traction drives and engaging at least one brake to prevent movement of the vehicle.

5. The programmable vehicle control system of claim 1, wherein, for each of the first control assembly and the second control assembly, the vehicle integration module is configured to verify a neutral position of the magnet when the neutral switch is activated.

6. The programmable vehicle control system of claim 1, wherein activation of the neutral switch of each of the first control assembly and the second control assembly is required to allow the vehicle to start.

7. The programmable vehicle control system of claim 1, wherein activation of the neutral switch of the first control assembly or the second control assembly initiates an engine kill function.

8. A vehicle control system comprising:
a communication network;
a vehicle integration module; and
a pair of control assemblies including a first control assembly and a second control assembly, wherein each of the pair of control assemblies is configured to be operated by a respective control lever and communicatively connected to the vehicle integration module to control an output of a respective traction drive, wherein each of the pair of control assemblies comprises:
an operator control assembly that includes a neutral switch;
a return-to-neutral assembly configured to provide a return force to the respective control lever when the respective control lever is pivoted away from a respective neutral position;
a return-to-neutral shaft supporting a portion of the return-to-neutral assembly;
a magnet attached to the return-to-neutral shaft;
a position sensor assembly including a circuit board, a magnetic field sensor configured to sense a rotational orientation of the magnet, and a plurality of terminals for communication with the circuit board; and
a linkage connecting the operator control assembly to the return-to-neutral assembly.

9. The vehicle control system of claim 8, wherein the operator control assembly of each of the pair of control assemblies further includes a pivot bar for providing operator input via the respective control lever.

10. The vehicle control system of claim 8, wherein the return-to-neutral assembly of each of the pair of control assemblies includes a control arm, a scissors return-to-neutral subassembly, and a fixed neutral arm.

11. The vehicle control system of claim 10, wherein the neutral arm is supported on the return-to-neutral shaft.

12. The vehicle control system of claim 10, wherein the linkage is configured to connect the control arm of the return-to-neutral assembly to a linkage attachment arm of the operator control assembly.

13. The vehicle control system of claim 8, wherein the position sensor assembly of each of the pair of control assemblies is sealed.

14. The vehicle control system of claim 8, further comprising a cable configured to connect to a first of the plurality of terminals to communicatively connect the circuit board to the communication network.

15. The vehicle control system of claim 8, further comprising electrical conductors configured to connect to a set of the plurality of terminals to communicatively connect the circuit board to the neutral switch.

16. A vehicle control system comprising:
a communication network of a vehicle including a vehicle integration module; and
a pair of control assemblies including a first control assembly and a second control assembly, wherein each of the pair of control assemblies is configured to be operated by a respective control lever and connected to the vehicle integration module to control an output of a respective traction drive, wherein each of the pair of control assemblies comprises:
an operator control mechanism including a neutral switch;
a return to neutral module operatively connected to the operator control mechanism, the return to neutral module comprising:
a return to neutral mechanism configured to provide a return force to the respective control lever when the respective control lever is pivoted away from a respective neutral position;
a return to neutral shaft at least partially supporting the return to neutral mechanism and having a magnet attached thereto; and
a position sensor module including a circuit board, a magnetic field sensor chip configured to sense a rotational orientation of the magnet, a first plurality of terminals configured to connect the circuit board to the communication network, and a second plurality of terminals configured to connect the neutral switch to the circuit board.

17. The vehicle control system of claim 16, wherein, for each of the pair of control assemblies, the neutral switch is configured to provide a signal to the vehicle integration module to place the respective traction drive of the vehicle in a neutral state.

18. The vehicle control system of claim 16, wherein, for each of the pair of control assemblies, the neutral switch is configured to provide a signal to the vehicle integration module to initiate more than one response by the vehicle including disengagement of a PTO device and placement of one or more electric motors in an unpowered state.

19. The vehicle control system of claim 16, wherein, for each of the pair of control assemblies, the neutral switch is configured to provide a signal to the vehicle integration module to initiate more than one response by the vehicle including removing power from the respective traction drive and engaging at least one brake to prevent movement of the vehicle.

20. The vehicle control system of claim 16, wherein, for each of the pair of control assemblies, the vehicle integration module is configured to verify a neutral position of the magnet when the neutral switch is activated.

\* \* \* \* \*